March 30, 1965     A. DREBES     3,175,543
AIR COMPRESSING PISTON INTERNAL COMBUSTION ENGINE
Filed Aug. 15, 1962     2 Sheets-Sheet 1

Inventor:
Armin Drebes
By

Inventor:
Armin Drebes

United States Patent Office 3,175,543
Patented Mar. 30, 1965

3,175,543
AIR COMPRESSING PISTON INTERNAL
COMBUSTION ENGINE
Armin Drebes, Neustadt-Waiblingen, Germany, assignor to Andreas Stihl, Waiblingen, Neustadt, Germany
Filed Aug. 15, 1962, Ser. No. 217,114
Claims priority, application Germany, Aug. 17, 1961,
St 18,221
5 Claims. (Cl. 123—32)

The present invention relates to an air compressing piston internal combustion engine which at the upper dead-center point of the piston has only a small air gap between the piston top and the cylinder head, while in the central zone of the piston top or the cylinder head there is provided a combustion chamber the contour of which is at least approximately semi-spherical and may vary from semi-spherical shape to ball shape.

With heretofore known internal combustion engines of the type involved, the entire surface of the piston top is substantially equally spaced from the cylinder head.

Internal combustion engines have become known in which the distance between the piston and the cylinder head around the combustion chamber opening is greater than in the neighborhood of the piston wall or cylinder wall.

It has been found that with the heretofore known internal combustion engines, oil coal and other combustion residues deposit at that zone of the piston which is closest to the cylinder wall. The thus formed deposits grow relatively fast and endanger a trouble-free operation of the internal combustion engine, and this occurs the earlier the smaller the remaining air gap between the piston top and the cylinder head is selected at the upper dead-center point.

It is therefore an object of the present invention to provide an air compressing piston internal combustion engine, which will overcome the above-mentioned drawbacks.

It is another object of this invention to provide an internal combustion engine of the type set forth in the preceding paragraph, which will greatly increase the trouble-free running period of the engine, i.e. the running period of the engine until the above-mentioned combustion residue deposits have collected to such an extent that a trouble-free operation may be impaired.

These and other objects and advantages of the invention will apepar more clearly from the following specification in connection with the accompanying drawings, in which.

The air compressing piston internal combustion engine according to the present invention is characterized primarily in that at the upper dead-center point of the piston, the distance between the piston and the cylinder head around the combustion chamber opening is by up to 1.4 times the width of the combustion chamber opening less than the distance between the piston top and the cylinder head at the remaining portions thereof.

Inasmuch as according to the finding of the present invention, the growth of the combustion residues on the piston body increases with increasing distance from the combustion chamber opening, it is advantageous to increase the axial distance between piston top and cylinder head in conformity with the distance increasing toward the cylinder wall from the combustion chamber opening. When the combustion chamber opening is located coaxially with regard to the longitudinal piston axis, it is advantageous, according to a further development of the present invention, to linearly increase the distance between piston and cylinder head with increasing distance from the piston axis, so that the piston top will have the contour of a truncated cone.

Figure 1:
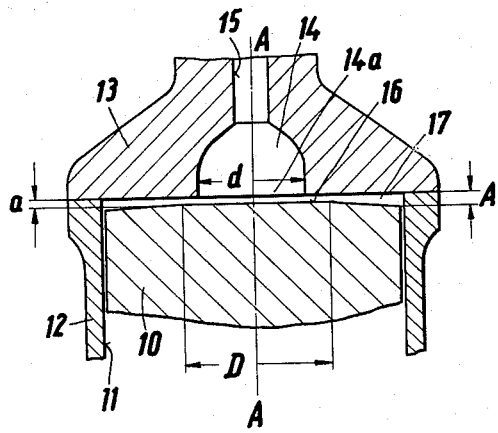
FIGURE 1 is a longitudinal section through a portion of a cylinder, piston, and cylinder head arrangement according to the present invention.

Referring now to the drawings in detail, and FIG. 1 thereof in particular, the cylinder piston and cylinder head arrangement according to FIG. 1 comprises a light metal piston 10 reciprocably mounted in the cylinder bore 11 of a cylinder block 12 having mounted thereon a cylinder head 13. This cylinder head 13 comprises a combustion chamber 14 the axis of which coincides with the cylinder axis A—A which, in turn, coincides with the piston axis. The combustion chamber 14 has a combustion chamber opening 14a of a diameter d opening into the cylinder bore 11. As soon as piston 10 has reached its upper deadcenter position shown in the drawing, fuel is injected into the combustion chamber 14 through an injection nozzle (not shown) which is screwed into the injection passage 15 coaxially arranged with the piston.

In order to produce the high compression pressure required for the ignition of the fuel, the piston top has a plane central zone 16 which is perpendiculer to the piston axis and the maximum diameter of which is in FIG. 1, designated with the letter D. This diameter corresponds to approximately 1.4 times the diameter d of the combustion chamber opening. This circular surface has the least distance a from the cylinder head 13. The annular surface area adjacent to said central surface 16 and extending to the outer periphery of the piston has a distance from the cylinder head 13 which increases with increasing radius. As will be seen from FIG. 1, the said annular surface area is inclined so as to define together with said central area a truncated cone-shaped contour. In this way, between the piston top and the adjacent cylinder head portion there will remain a conically outwardly increasing annular gap 17 which has its maximum distance from the cylinder head at its maximum diameter, as indicated by the letter A. The conical increase of the annular gap 17 makes it possible that the unavoidable combustion residues will deposit to a greater extent in those zones which are adjacent to the cylinder wall and piston periphery. This greatly reduces the danger of disturbances during operation.

Figure 2:
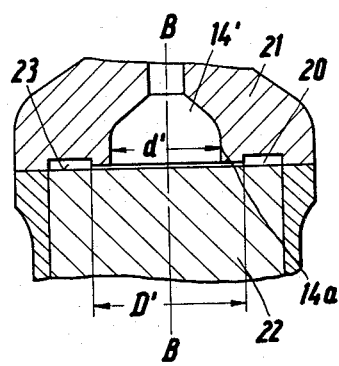
FIGURE 2 illustrates a section similar to that of FIGURE 1 with the difference that the larger distance between the cylinder head and marginal top portions of the piston top is obtained by a groove in said cylinder head.

The embodiment shown in FIG. 2 differs from that of

FIG. 1 in that the increase in the distance between the piston top and the cylinder head is obtainable by an annular groove 20 which is coaxially arranged with regard to the cylinder axis B—B in the cylinder head 21, whereas piston 22 has a plane parallel top surface 23. The annular cylinder top surface which is adjacent the combustion chamber opening 14'a and has a diameter $d'$, has the least distance from the piston top and extends radially to the diameter $D'$ of groove 20. Within the range of groove 20, the distance between the cylinder head and the piston top is considerably greater than that of the annular zone which extends up to 1.4 times the diameter $d'$ and extends up to the diameter $D'$.

Figure 3:
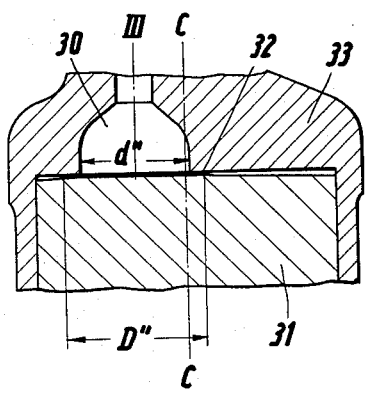
FIGURE 3 shows a modification of the cylinder piston and cylinder head arrangement according to the invention, in which the axis of the combustion chamber is arranged eccentrically with regard to the axis of the piston and the cylinder.

With the embodiment according to FIG. 3, the axis III of the combustion chamber 30 is eccentrically located with regard to the longitudinal axis C—C of the piston 31. The piston top has a plane annular surface area 32 which is located coaxially with regard to the combustion chamber axis III and the maximum diameter $D''$ of which corresponds to substantially 1.4 times the diameter $d''$ of the fuel combustion chamber opening. From said annular area 32 on, the top of piston 31 confines with the adjacent surface of the cylinder head 33 an annular gap which increases in height with increasing distance from the axis III.

Figure 4:
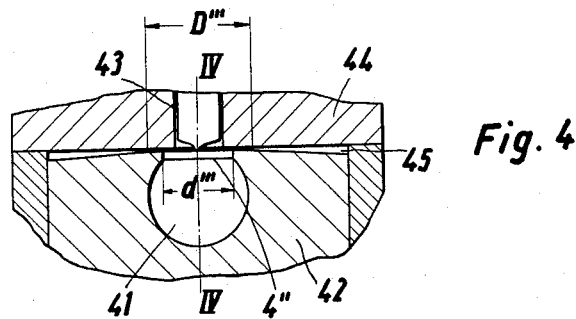
FIGURE 4 illustrates a section through a cylinder piston-cylinder head arrangement, in which the combustion chamber is located in the piston with the vertical axis of said combustion chamber coinciding with the longitudinal axis of the piston.

Referring now to the embodiment of FIG. 4, it will be seen from the drawing that the combustion chamber 41 is located within the piston 42 and has an approximately ball-shaped configuration. The opening of the combustion chamber is located coaxially with regard to the longitudinal axis IV—IV of the piston. The opening 41' of the combustion chamber 41 has a diameter $d'''$. As will also be evident from the drawing, the piston top is plane at its central zone which is located opposite the injection passage 43 of cylinder head 44. The said central plane zone of the piston top has a maximum diameter $D'''$ which latter corresponds to substantially 1.4 times the diameter $d'''$. From the said central zone on, the piston top inclines toward the periphery of the piston similar to the arrangement of FIG. 1 so that an annular gap 45 is formed, which increases in height toward the periphery of the piston. The distance between the cylinder head and the piston top in the neighborhood of the marginal piston top surface is considerably greater than at the central zone of the piston 42.

Figure 5:
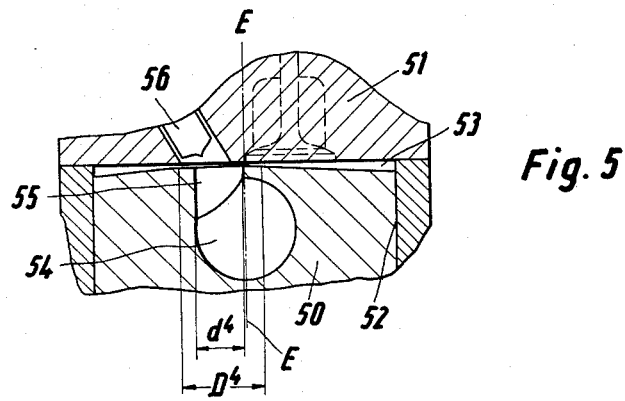
FIGURE 5 illustrates a further embodiment of the present invention according to wihch the annular gap between the piston top and the cylinder head, which gap increases toward the periphery of the piston, is arranged asymmetrically with regard to the longitudinal axis of the piston.

Also with the embodiment shown in FIG. 5, the peripheral top area of the piston 50 confines with the adjacent area of the cylinder head 51 an annular gap 53 increasing in height toward the periphery of the piston 50. The combustion chamber 54 has an inner contour which is approximately ball-shaped and near the piston top leads into a passage 55. This passage 55 absorbs the fuel jet which leaves the fuel injection nozzle 56. The piston top is plane along an annular zone located cencentrically with regard to the fuel chamber opening having a diameter $d^4$, which annular zone extends to a diameter $D^4$. With increasing distance from the fuel opening, the distance of the piston top from cylinder head 51 increases with the increase in the distance of the respective piston top surface area from the central longitudinal axis of the piston and prevents the combustion residue deposits which increasingly collect at the cooler zone adjacent the piston outer periphery, from interfering with the operation of the engine.

Figure 6:
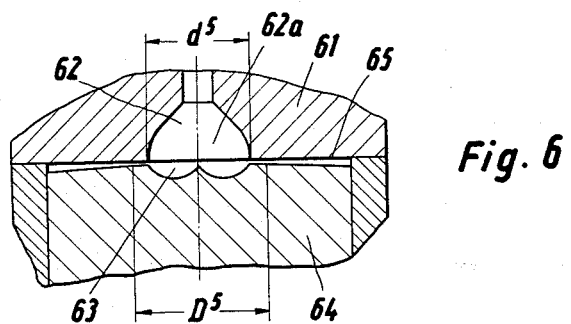
FIGURE 6 shows still another embodiment of the present invention according to which the major portion of the combustion chamber is located in the cylinder head, whereas a smaller portion of the combustion chamber, in form of an annular trough, is located in the piston bottom.

FIG. 6 shows a further modification which is particularly suitable for 4-cycle internal combustion engines. According to this embodiment, the combustion chamber 62 in the cylinder head is faced by an annular trough 63 in the top of the piston 64. The piston bottom is plane parallel at the annular zone directly adjacent the said trough 63 with regard to the end face 65 of the cylinder head 61. This annular surface has a maximum diameter $D^5$ which amounts to substantially 1.4 times the diameter $d^4$ of the opening 62a of the combustion chamber 62. Inasmuch as those portions of the cylinder head 61 and piston 64 which are adjacent the combustion chamber 62 are heated to high temperatures, the distance between the plane parallel annular zone of the piston top from the end face 65 of the cylinder head 61 may be selected very small because here, the danger of oil coal deposits and other combustion residues is only minor. From this annular zone on, the distance between piston top and cylinder head increases gradually toward the periphery of the piston inasmuch as the piston body has a truncated cone-shaped top surface.

The particular advantage of the described arrangement consists in that with the same soot formation of the employed fuels, the disturbance-free running periods of the engine will be greatly increased.

It is, of course, to be understood, that the present invention is, by no means, limited to the particular construction shown in the drawings but also comprises any modifications within the scope of the appended claims.

What I claim is:

1. An air compressing internal combustion engine, which comprises: a cylinder, a first member in the form of a cylinder head mounted on said cylinder, a second member in the form of a piston reciprocably mounted in said cylinder and having a piston top facing said cylinder head and in the upper dead center position of said piston confining a minimum chamber with the adjacent surface of said cylinder head, one of said members having a combustion chamber therein of approximately spherical contour and with an opening facing the other one of said members, said piston top having a circular area which is coaxial with said opening and having a diameter of about 1.4 times the diameter of said opening, one of said piston top and cylinder head outwardly of said area being so formed that in top dead center position of the piston the distance between said area of said piston top and the adjacent cylinder head surface is less than the distance between the cylinder head and the other piston top area located radially outwardly of said area.

2. An internal combustion engine according to claim 1, in which the distance between said cylinder head and said piston top in said one dead center position is greatest at the periphery of said piston and gradually decreases inwardly from the periphery thereof.

3. An air compressing internal combustion engine, which comprises: a cylinder, a cylinder head mounted on said cylinder, said cylinder head having provided therein a combustion chamber having an opening directed toward said piston top, a piston reciprocably mounted in said cylinder and having a piston top facing said cylinder head and in top dead center position of said piston confining a minimum chamber with the adjacent surface of said cylinder head, the area of said cylinder head around the periphery of said opening and extending therefrom to encompass a region having a diameter of about 1.4 times the diameter of said opening and being substantially parallel to the top of said piston, and at least a portion of the remaining piston top and cylinder head radially outwardly of said area being spaced from each other by a distance substantially greater than the distance between said piston top and cylinder head within said area.

4. An air compressing internal combustion engine, which comprises: a cylinder, a cylinder head mounted on said cylinder, a piston reciprocably mounted in said cylinder and having a piston top facing said cylinder head and being provided with a combustion chamber having an opening and in top dead center position of said piston confining a minimum chamber with the adjacent surface of said cylinder head, the area of the piston top around the periphery of said opening and extending therefrom outwardly to encompass a region having a diameter of about 1.4 times the diameter of said opening and being substantially parallel to the bottom of said cylinder head and at least a portion of the remaining piston top and cylinder head bottom radially outwardly of said area being spaced from each other by a distance substantially greater than the distance between said piston top and cylinder head bottom within said area.

5. An internal combustion engine according to claim 1, in which the said other piston top radially outwardly from said area is of conical shape so that the distance between said cylinder head and said conical piston top area gradually increases toward the periphery of said piston.

References Cited in the file of this patent

UNITED STATES PATENTS

| | | |
|---|---|---|
| 1,235,725 | Power | Aug. 7, 1917 |
| 1,745,884 | Barnaby | Feb. 4, 1930 |
| 2,107,792 | Husby | Feb. 8, 1938 |
| 2,845,917 | Laubender | Aug. 5, 1958 |